United States Patent [19]

Hoppe et al.

[11] Patent Number: 5,071,892
[45] Date of Patent: Dec. 10, 1991

[54] DESENSITIZED NITROCELLULOSE MIXTURES

[75] Inventors: Lutz Hoppe; Klaus Szablikowski, both of Walsrode; Michael Piepho, Elze, all of Fed. Rep. of Germany

[73] Assignee: Wolff Walsrode AG, Walsrode, Fed. Rep. of Germany

[21] Appl. No.: 429,683

[22] Filed: Oct. 31, 1989

[30] Foreign Application Priority Data

Nov. 15, 1988 [DE] Fed. Rep. of Germany ....... 3838646

[51] Int. Cl.$^5$ ............................ C08B 3/00; C08B 5/00
[52] U.S. Cl. ......................................... 524/31; 536/32
[58] Field of Search ............................ 536/32; 524/31

[56] References Cited

U.S. PATENT DOCUMENTS

| 2,109,599 | 3/1938 | Tattersall | 524/31 |
| 3,063,981 | 11/1962 | Cochrane, III et al. | 536/39 |
| 4,460,411 | 7/1984 | Ohtake et al. | 524/31 |
| 4,615,852 | 10/1986 | Engel et al. | 106/172 |
| 4,963,296 | 10/1990 | Niedermeier et al. | 264/3.2 |

FOREIGN PATENT DOCUMENTS 781444 3/1972 Belgium .
1203652 10/1965 Fed. Rep. of Germany .
8802743 4/1988 PCT Int'l Appl. .

Primary Examiner—Nathan M. Nutter
Attorney, Agent, or Firm—Sprung Horn Kramer & Woods

[57] ABSTRACT

Improved nitrocellulose mixtures contain a polyol as the desensitizing agent, the polyol being a solvent for nitrocellulose, soluble in water to a maximum of 10% at 20° C. and non-volatile.

10 Claims, No Drawings

DESENSITIZED NITROCELLULOSE MIXTURES

The invention relates to a new mixture of nitrocellulose and desensitizing agents.

Nitrocellulose (more precisely cellulose nitrate) is known as an essential constituent of many lacquer systems (c.f. e.g. U. Biethan, Lacke und Lösemittel (Lacquers and Solvents), Verlag Chemie GmbH, Weinheim, 1st edition (1979), p. 8). For safety reasons, a desensitizing agent must on principle be added to commercial grades of nitrocellulose. By desensitizing agents below there are to be understood, in accordance with page 9 of the above-mentioned literature reference, those substances which reduce the explosive character of dry nitrocellulose.

A suitable desensitizing agent can be water, an alcohol or a plasticizer (e.g. esters of phthalic acid—c.f. e.g. K. Fabel, Nitrocellulose, S. Enke-Verlag, 1950). Such desensitizing agents can be incorporated into the nitrocellulose by various methods.

Water can be incorporated into nitrocellulose via centrifuge technology, nitrating acid from the nitrocellulose preparation being displaced by water in a centrifuge by spraying, on water (c.f. K. Fabel, Nitrocellulose, p. 100 et seq. and US-PS-3 063 981).

A process for the preparation of carbon black concentrates based on nitrocellulose in the form of chips with the addition of plasticizers and resins free from OH groups is described in DE-A-3 304 688. However, the disadvantage of this process is that closed apparatus, such as kneaders or extruders with kneading screws, are used. These practically closed units have the disadvantage that in the event of a decomposition of the nitrocellulose generated by friction, an increased pressure can build up, which can cause explosions. In addition, carbon black is always also used in this process.

A process for the preparation of nitrocellulose chips without also using carbon black is described in DE-AS-1 203 652. The process does not operate continuously, takes place in a closed mixer and uses exclusively plasticers containing no hydroxyl groups, e.g. dibutyl phthalate.

Nitrocellulose modifications which contain either alcohol or water as desensitizing agents or plasticizers which contain no hydroxyl groups are not ideally suitable for combination with isocyanates. The polyurethane lacquers which result from such a combination either have too high a content of monofunctional alcohols, which react with isocyanates without the formation of crosslinking points, or lead to the formation of bubbles as a result of the evolution of carbon dioxide from the reaction of water with isocyanates. If chips which are desensitized with plasticizers containing no OH groups are used, exudation phenomena of the plasticizers may occur, since these are not incorporated into the polyurethane network. Such exudation phenomena likewise have an adverse influence on the quality of polyurethane lacquerings.

Products in which the nitrocellulose is desensitized with volatile inert solvents are described in the literature as another possibility for the preparation of nitrocellulose forms of supply which are also suitable as binders in polyurethane lacquers. Desensitizing agents which are volatile and at least partly solvents for nitrocellulose, so that the nitrocellulose-desensitizing agent combinations are homogeneous products, are described in DE-A 3 041 085.

The disadvantage of the systems according to DE-A 3 041 085, however, is that the inert gelatinizing components mentioned (example: ethyl acetate and cyclohexanone) evaporate during use. Because of the volatility of the desensitizing agents mentioned, the products have a disadvantage in that the solvent can evaporate during storage. Preparations with a very low content, if any, of solvent are thus obtained, which means that the fire risk of the nitrocellulose preparations increases. Another disadvantage lies in the expensive preparation. In order to be able to remove water from the nitrocellulose-water-desensitizing agent combination, it is necessary for the water to be removed by azeotropic distillation. This working step is expensive and hazardous.

The present invention was based on the object of providing improved desensitized nitrocellulose, wherein the nitrocellulose/desensitizing formulations according to the invention should be virtually anhydrous.

The invention relates to nitrocellulose mixtures containing at least one desensitizing agent, characterized in that the desensitizing agent is a polyol which a) is a solvent for nitrocellulose, b) is soluble in water at 20° C. to a maximum of 10 wt.% and c) is non-volatile.

By non-volatile polyols there are to be understood those which have an evaporation number of more than 1,000 (diethyl ether=1).

The polyols P are preferably compounds having a viscosity of 10 to 3,000 mPa.s, in particular 100 to 1,000 mPa.s, measured at 20° C. The hydroxyl content of the polyols P is preferably 1 to 20 wt.%, in particular 3 to 8 wt.%.

In a particularly preferred embodiment, the polyols P are optionally branched polyesters containing hydroxyl groups. Particularly preferred polyesters P are obtainable by reaction of at least one aliphatic dicarboxylic acid, at least one diol and at least one alcohol with more than three OH groups and if appropriate at least one polybasic aromatic carboxylic acid or derivatives thereof.

Particularly preferred starting substances for polyesters to be used according to the invention are:

aliphatic dicarboxylic acids: adipic acid, succinic acid, maleic acid (anhydride) and hydrogenated phthalic acid (anhydride), diols: 1,4-butylene glycol, 1,2-propylene glycol, ethylene glycol and neopentylglycol, polyhydric alcohols: hexanetriol, trimethylolpropane, pentaerythritol and castor oil (optionally hydrogenated), aromatic carboxylic acid (derivatives): phthalic anhydride and trimellitic acid (anhydride).

Commercially available grades of nitrocellulose of various viscosity levels and having a nitrogen content of 10 to 12.6% are preferably employed to produce the nitrocellulose-desensitizing agent combinations according to the invention. It is likewise possible to employ nitrocellulose having a nitrogen content of up to 14.14% (maximum).

In addition to the polyol desensitizing agents P to be employed according to the invention, it is also possible to employ other desensitizing agents which are known per se, for example esters of phthalic or adipic acid, in particular dibutyl phthalate. In addition to polyhydric alcohols, it is also possible to use monohydric alcohols, e.g. tributyl citrate or 2,2-dimethyl-3-hydroxy-4-methylpentyl iso-butyrate (Texanol from Eastman-Kodak). Mixtures of desensitizing agents which dissolve nitrocellulose and desensitizing agents which do not dissolve nitrocellulose can also be employed, e.g. mixtures of citric acid esters and castor oil. It is also possible to use mixtures in which one component has a water solubility of more than 10%. Example: mixture of polyester-polyol and tripropylene glycol.

In a preferred embodiment, the mixtures according to the invention contain, based on the total weight, at least 18%, in particular 18 to 45 wt.%, of the polyol P. If desensitizing agents which are known per se are added in addition to the polyol P, these are preferably employed in an amount of 5 to 15 wt.%, based on the total mixture. In the case of such mixing of densisitizing agents, the total content of desensitizing agents is preferably 18 to 60, in particular 18 to 45 wt.%.

The invention furthermore relates to a process for the preparation of mixtures of nitrocellulose and at least one desensitizing agent, characterized in that nitrocellulose moistened with water and/or alcohol is treated with a polyol P according to the invention, the water or alcohol being displaced. For this purpose, the nitrocellulose is preferably first moistened with at least 25% water or alcohols, such as e.g. ethanol, isopropanol or butanol.

In a particularly preferred embodiment, the process according to the invention is carried out on a shearing roll unit. The shearing roll unit is preferably an open twin-screw extruder with two parallel shearing rolls which are arranged horizontally and operate in opposite directions, the product being fed in on one side o& the rolls and removed on the other side. The rolls are provided with shearing grooves which effect transportation of the mixture fed in.

The width of the grooves is preferably 5 to 30 mm, the depth 1 to 10 mm, the distance C between the grooves 30 to 300 mm and the angle at which the grooves are located in relation to the axis of rotation of the rolls 10° to 80°. These grooves enable the material to be conveyed continuously on the roll unit from one end of the roll to the other. The raw materials can be introduced continuously into the roll nip separately via metering units.

In a preferred embodiment, the mixture of nitrocellulose moistened with water or alcohol and desensitizing agent (polyol P) is introduced onto one half of the roll unit; the nitrocellulose-desensitizing agent mixture containing less than 2.5% water is removed on the other half of the roll unit. The mixture of moistened nitrocellulose and desensitizing agent is transported between the feed zone and withdrawal zone by the grooves incorporated into the rolls. After withdrawal of the nitrocellulose-desensitizing agent mixture from the roll, the mass can be converted into flakes, platelets, strips or granules. These shaped articles can—if necessary—be after-dried e.g. with a commercially available hot air drier. The bulk density of the NC-densensitizing agent mixture is 500 to 900 g/l, whereas the bulk density of the moistened nitrocellulose employed is only about 250 to 350 g/l.

The incorporation of the desensitizing agent P or additional desensitizing agents can also be carried out in a manner which is known per se, however, by spraying the desensitizing agent onto the alcohol- or water-moist nitrocellulose in a continuously operating pusher centrifuge or in a conventional kneading unit.

Finally, the invention relates to the use of the nitrocellulose mixtures according to the invention, containing a desensitizing polyol P, for the preparation of lacquers, in particular for use in polyurethane lacquers. Preferred polyurethane lacquers of this type are built up on the basis of polyisocyanates, polyols, inert organic solvents and other auxiliaries, such as accelerators, matting agents, pigments, levelling agents etc.

To prepare polyurethane lacquers, the nitrocellulose mixtures according to the invention are advantageously first dissolved in the solvents using commercially available stirring units, and then the other lacquer raw materials are added.

EXAMPLE 1

Nitrocellulose of the standard grade 32 E (moistened with 35% water) is introduced onto a shearing roll unit (length of the roll: 1,500 mm; diameter of the roll: 200 mm) continuously by means of a metering screw. At the same time, a polyester containing hydroxyl groups (Desmophen 1200 from Bayer AG, Leverkusen, viscosity=250 mPa.s/20%) is introduced such that the ratio between dry nitrocellulose and desensitizing agent is 7:3. The rear roll of the two is thermostatically controlled at 130° C.; the front at 80° C. The speed of rotation of the front roll is 35/min, and that of the rear roll 27/min. Mixing of the nitrocellulose-desensitizing agent combination is effected such that the mixing time on the roll (average residence time) is about 3 min. Grooves are incorporated into the rolls such that the nitrocellulose-desensitizing agent mixture is conveyed from one end of the rolls to the other. After the nitrocellulose-desensitizing agent combination had been mixed in the roll nip for 3 min and the water had been pressed out or had evaporated, the nitrocellulose-desensitizing agent mixture was taken off from the front roll and granulated by means of a granulating unit. The residual water content of the granules was 1.5%.

USE 6 g of the resulting nitrocellulose granules with 4 g polyol P1 were dissolved in 15 ml butyl acetate. The polyol P1 has the following characteristic data:

Hydroxyl content: about 5.2%

Density at 20° C. according to DIN 51 757: about 1.12 g/cm$^3$

Viscosity at 20° C.: 300±50 mPa.s

Polyol P1 is a branched polyester containing hydroxyl groups (Desmophen ® 1200).

A reactive two-component polyurethane lacquer with a pot life > 12 h and a solids content of 48% was obtained by addition of 8 g hexamethylene diisocyante prepolymer (75% solids, dissolved in 1-methoxyprop-2-yl acetate/ xylene=1/1). Coatings obtained from wet films 90 μm thick on glass were scratch-resistant after 48 h and had a König pendulum hardness (DIN 53 157) of 35 s.

A reactive polyurethane lacquer with a pot life at 25° C. of 30 min and a solids content of 46% is obtained by addition of 12 g of an isocyanate prepolymer based on toluylene diisocyanate and hexamethylene diisocyanate (Desmodur ® HL from Bayer AG with 60% solids, dissolved in butyl acetate). After coating a glass plate (90 μm wet film thickness) and evaporating of the solvent, the lacquer hardens at 25° C. in less than 1 h to give a tackfree film, the pendulum hardness of which, measured after 24 h, is 180 s.

After hardening, the lacquers according to 1 and 2 contain no measurable contents which can be extracted with butyl acetate. In the coating of wood, the lacquers exhibit very good staining, a good pore flow and good scratch resistance. The pot life and hardness of the coatings can be controlled within wide ranges by mixing the isocyanates.

We claim:

1. Nitrocellulose mixtures containing at least one desensitizing agent, characterized in that the desensitizing agent is a polyol which
   a) is a solvent for nitrocellulose,
   b) is soluble in water at 20° C. to a maximum of 10 wt.% and
   c) is non-volatile.

2. Nitrocellulose mixtures according to claim 1, characterized in that the viscosity of the polyol at 20° C. is 10 to 3,000 mPa.s and the OH content is 1 to 20%.

3. Nitrocellulose mixtures according to claim 1, characterized in that the polyol is a polyester containing hydroxyl groups.

4. Nitrocellulose mixtures according to claim 1, characterized in that the polyol is a polyester obtainable from at least one aliphatic dicarboxylic acid, at least one diol and at least one polyhydric alcohol having at least three OH groups.

5. Nitrocellulose mixtures according to claim 4 characterized in that the aliphatic dicarboxylic acid is adipic acid.

6. Nitrocellulose mixtures according to claim 4, characterized in that the diols are propylene glycol or butylene glycol.

7. Nitrocellulose mixtures according to claim 4, characterized in that the polyhydric alcohols are trimethylolpropane or hexanetriol.

8. Process for the preparation of nitrocellulose mixtures according to claim 1 containing at least one desensitizing agent, characterized in that nitrocellulose moistened with water, alcohol, or a mixture of water and alcohol is mixed with, as the desensitizing agent, a polyol which
   a) is a solvent for nitrocellulose,
   b) is soluble in water at 20° C. to a maximum of 10 wt. % and
   c) is non-volatile,
the water or alcohol or mixture of water and alcohol bing displaced.

9. Process according to claim 8, characterized in that the water or alcohol or mixture of water and alcohol being displaced is displaced on a shearing roll unit.

10. A method for preparing polyurethane lacquers, comprising the steps of dissolving a nitrocellulose mixture according to claim 1 in an inert organic solvent in a stirring unit then adding other lacquer raw materials.

* * * * *

UNITED STATES PATENT AND TRADEMARK OFFICE
CERTIFICATE OF CORRECTION

PATENT NO. : 5,071,892

DATED : December 10, 1991

INVENTOR(S) : Hoppe et al.

It is certified that error appears in the above-identified patent and that said Letters Patent is hereby corrected as shown below:

Col. 6, line 18   Delete " bing " and substitute -- being --

Signed and Sealed this

Twenty-ninth Day of June, 1993

Attest:

MICHAEL K. KIRK

Attesting Officer

Acting Commissioner of Patents and Trademarks